United States Patent [19]
Van Putten, Jr.

[11] 3,748,025
[45] July 24, 1973

[54] DAY-NIGHT MIRROR

[75] Inventor: James D. Van Putten, Jr., Holland, Mich.

[73] Assignee: Donnelly Mirrors, Inc., Holland, Mich.

[22] Filed: Feb. 8, 1971

[21] Appl. No.: 113,397

[52] U.S. Cl. ............... 350/280, 350/283, 350/285
[51] Int. Cl. .................................................. B60r 1/04
[58] Field of Search ................ 350/278, 280, 281, 350/283, 285

[56] References Cited
UNITED STATES PATENTS

| | | | |
|---|---|---|---|
| 3,514,182 | 5/1970 | Banks | 350/285 X |
| 3,649,105 | 3/1972 | Treuthart | 350/285 |
| 3,443,098 | 5/1969 | Lewis | 350/285 X |
| 3,552,825 | 1/1971 | Wellbrock | 350/285 X |
| 3,556,638 | 1/1971 | Bank et al. | 350/285 X |
| 3,614,210 | 10/1971 | Caplan | 350/278 |
| 1,919,475 | 7/1933 | McKinley | 350/280 |
| 3,455,625 | 7/1969 | Brumley et al. | 350/169 X |
| 3,280,701 | 10/1966 | Donnelly et al. | 350/278 X |

FOREIGN PATENTS OR APPLICATIONS

| | | | |
|---|---|---|---|
| 1,120,517 | 7/1968 | Great Britain | 350/280 |
| 680,686 | 10/1952 | Great Britain | 350/283 |

*Primary Examiner*—John K. Corbin
*Attorney*—Price, Heneveld, Huizenga & Cooper

[57] ABSTRACT

This disclosure relates to a day-night or anti-glare mirror formed from a laminate wherein at least one layer is changeable from a condition which permits the transmission of light therethrough to a condition which scatters light incident thereon, thereby greatly reducing the transmission of light therethrough. In one embodiment, this layer is formed of a transparent, soft, yieldably resilient, solid material. A surface with a roughened texture is formed in the soft, yieldably resilient, solid material or a layer adjacent thereto so that when the roughened texture surface is separated from the adjacent surface, transmission of light is greatly reduced by the roughened surface by scattering, and when the roughened texture surface is pressed firmly against the layer adjacent thereto, light is easily transmitted through the composite laminate. Means are disclosed for separating and pressing together the rough textured surface and the surface adjacent thereto.

8 Claims, 4 Drawing Figures

Patented July 24, 1973  3,748,025

INVENTOR
JAMES D. VAN PUTTEN JR.

BY *Price, Heneveld, Huizenga & Cooper*

ATTORNEY

DAY-NIGHT MIRROR

BACKGROUND OF THE INVENTION

This invention relates to an optical assembly, and in a preferred embodiment, to a day-night mirror.

Day-night mirrors, used as automobile rearview mirrors, are adapted to reflect light as a normal mirror during normal operating conditions, such as in the daytime, and adapted to reduce the reflection from the mirror during nighttime use when glare from high beam headlights becomes a safety hazard.

One well-known form of a day-night mirror is the prismatic type in which the reflective layer is prism shaped with the reflective coating on the back surface. In normal use, the image is viewed as it is reflected from the reflective back surface. The front surface, which is not reflective in nature, but which reflects about 4 percent of the light, produces a "ghost" image during the normal use since the plane of the front surface is angularly disposed to the plane of the reflective surface. The ghost image is undesirable in that during normal daytime use a clear image is not obtained.

A second type of mirror is the so-called fluid mirror which is exemplified by U.S. Pat. Nos. 3,000,622 and 3,198,070. In this type of mirror, the reflection is reduced by forcing a light absorbing liquid between two glass or similar plates, the back plate having a reflective surface. However, the reflection reducing compounds are subject to decomposition and the entire mirror assembly is expensive to construct.

A third type of day-night mirror uses a mechanical shield which can be flipped over the regular viewing surface for night driving. Though this type of mirror functions properly, it is objectionable because of its appearance. The shield is an unsightly appendage which is not welcome in the sleek modern cars.

Thus, there is a need for a day-night mirror which is free of the drawbacks of the above-described mirrors.

SUMMARY OF THE INVENTION

According to the present invention, there is provided an optical assembly useful as a day-night mirror in which a sharp clear vision can be obtained for normal viewing with no angularly displaced double image, in which reflection therefrom can be reduced, and in which the component substances are stable and not subject to decomposition. Furthermore, this invention provides an optical assembly useful as a day-night mirror which can be inexpensively made, which has no unsightly appendages suspended therefrom, and through which passage of light can be restricted or unrestricted as desired.

The optical assembly comprises a mirror formed from a laminate wherein at least one layer is changeable from a condition which permits the transmission of light therethrough to a condition which scatters light incident thereon, thereby greatly reducing the transmission of light therethrough. In one embodiment, the optical assembly comprises a reflective layer having a planar surface, the reflective layer being adapted to reflect light incident to the planar surface, and a transparent layer adjacent the reflective layer having a planar surface adjacent the reflective layer planar surface. The transparent layer is formed of a soft, yieldably resilient material. One of the transparent layer and/or reflective layer planar surfaces has a roughened texture so as to substantially reduce by scattering, reflection of light from the reflective layer and through the transparent layer when the reflective and transparent planar surfaces are separated. The roughened texture is such that the reflection of light from the reflective layer is not reduced when the reflective layer and transparent layer planar surfaces are pressed firmly in contact with each other. In a preferred embodiment of the invention, a rigid transparent layer is positioned adjacent the transparent layer of soft, yieldably resilient, solid material on the opposite side from the reflective layer.

In another preferred embodiment of the invention, an optical assembly is formed from a first transparent layer of rigid construction and a second transparent layer formed of a soft, yieldably resilient, solid material. One of the surfaces between the first and second layer has a roughened texture so as to permit passage of light through the first and second transparent layers when the layers are pressed together and to greatly restrict, by scattering, the passage of light through the transparent layers when the surface with the roughened texture is separated from the surface adjacent thereto.

DESCRIPTION OF THE PREFERRED EMBODIMENTS

Figure 1:
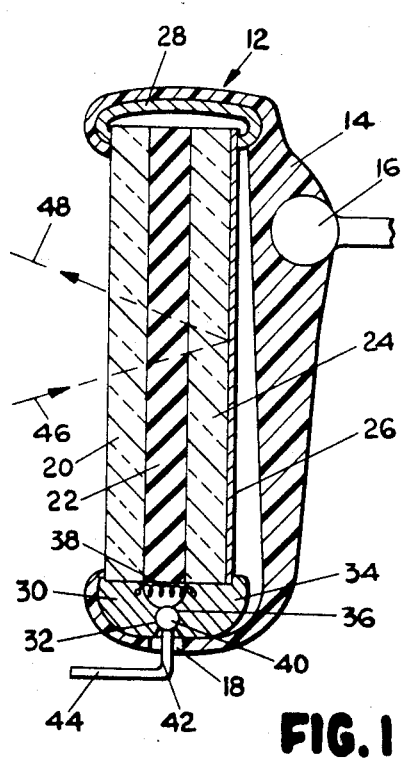
FIG. 1 is a cross-sectional view of a rearview mirror embodying the invention shown in one position for normal viewing.

Referring to the drawings, there is shown a mirror unit 12 having an external casing 14 of plastic or similar material molded onto the mirror elements. A ball-containing support bracket 16 is molded into the external casing 14. An opening 18 is provided at the bottom of the casing 14.

Figure 2:
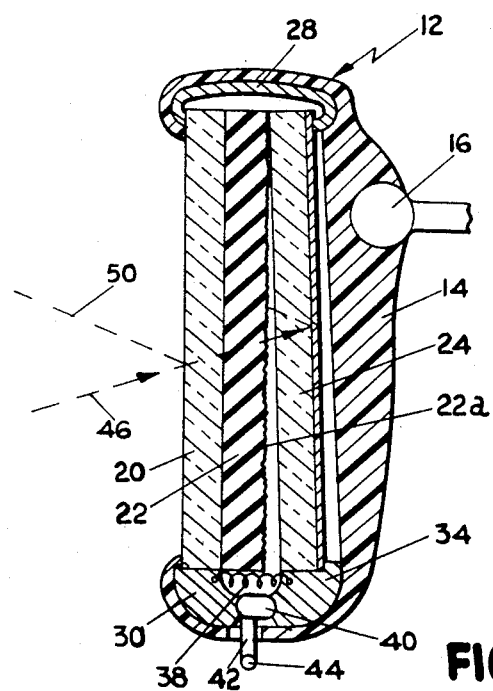
FIG. 2 is a view similar to FIG. 1 showing the mirror of FIG. 1 in a position for night viewing.

The mirror unit comprises a glass plate 20, a yieldably resilient, soft, solid material 22 forming a second layer and a glass mirror plate 24 having a reflective layer 26. In this embodiment, the reflective layer 22 can be on the front or back side of the glass mirror plate 24. The composite laminate is held at the top by a hinge plate 28. A cam plate 30 extends downwardly from the glass plate 20 and has a socket 32 at a bottom inner portion. A cam plate 34 extends downwardly from the glass mirror plate 24 and forms a socket 36 at the bottom inner portion. A spring 38 is interposed between cam plates 30 and 34 in tension to draw the laminate tightly together at the bottom portion thereof. An elliptical ball member 40 is positioned within the sockets 32 and 36 and has a stem 42 extending downwardly from the ball member and terminating in a horizontal handle 44. As can be seen from FIG. 2, as the handle 44 is turned, the elliptical ball member 40 forces the cam plates 30 and 34 apart.

According to one embodiment of the invention, the layer of yieldably resilient, soft, solid material 22 is transparent and is adhesively secured to the glass plate 20. The resilient solid material 22 has a roughened surface 22a adjacent the front surface of the glass mirror plate 24. When the three layers are held tightly together, the smooth front surface of the glass plate 24 smooths out the roughened layer 22a so that light is transmitted through the three layers and is reflected from the reflective layer 26 back through the three layers. As seen in FIG. 1, the incident light ray 46 passes through layers 20, 22 and 24 and is reflected from reflective layer 26. The reflected ray 48 passes through layers 24, 22 and 20.

When the roughened surface 22a of the soft resilient layer 22 is separated from the glass mirror plate 24, then the light rays 46 after being reflected by the reflective layer 46 pass through the glass plate 24 but are scattered by the roughened surface 22a of the soft resilient layer 22. Accordingly, the light rays reflected from the reflective layer 26 do not pass through the soft resilient layer 22 and back through the glass plate 20. A small percentage (about 4 percent) of the incident light is reflected from the front surface of the glass plate 20. A partially reflected light ray 50 forms an image for a night mirror.

Figure 3:
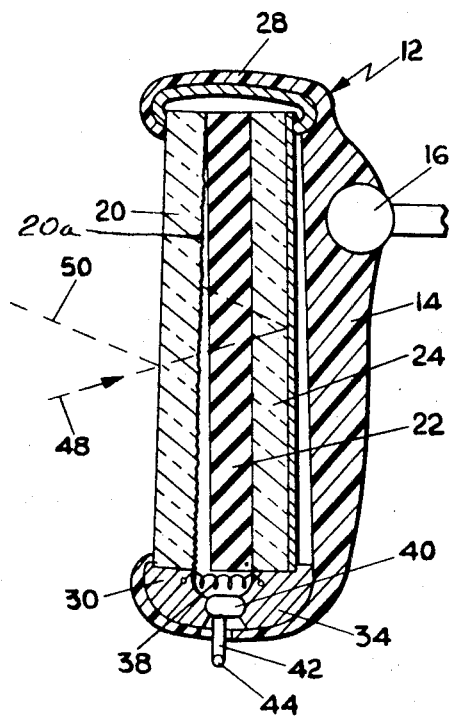
FIG. 3 is a view similar to FIG. 1 illustrating a modified form of the mirror in the night viewing position.

In the modification shown in FIG. 3, the resilient, soft, solid layer 22 is adhesively secured to the glass mirror plate 24. A roughened surface 20a is provided on the back surface of the glass plate 20. When the roughened surface 20a is separated from the soft resilient layer 22, the incident light ray passes through the three layers 20, 22 and 24 and can be reflected by the reflective layer 26. Upon passing back through the laminate, as the light ray impinges upon the roughened surface 20a, it is scattered so that it does not pass back through the glass plate 20. A partially reflected ray 50 from the front surface of the glass plate 20 will provide a sufficient image for a night mirror. When the three layers are pulled tightly together, the front surface of the resilient soft layer 22 will fill in the depressions in the roughened layer 20a so as to make a solid unit much the same as that illustrated in FIG. 1. When the three layers are pressed tightly together, as will be obtained by moving handle 44 to the position shown in FIG. 1, the incident light rays will pass through the three layers, be reflected from the reflective layer 26 and passed out through the three layers in the same manner as has been described with reference to the first embodiment and as shown in FIG. 1.

Figure 4:
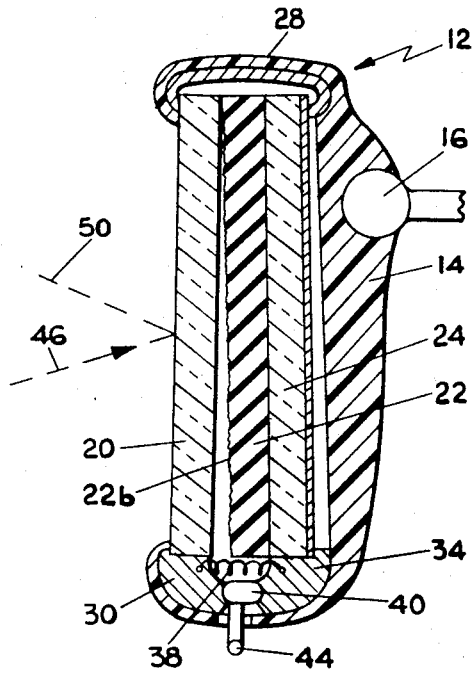
FIG. 4 is a view similar to FIG. 1 illustrating a second modified form of the invention in a night viewing position.

In the modification shown in FIG. 4, the soft solid layer 22 is secured to the mirror plate 24 and the front surface 22b of the soft resilient layer 22 has been roughened. When the layers are spread apart as illustrated in FIG. 4, the incident light ray 46 is partially scattered upon passing through the layer 22 by the surface 22b. That portion of the light ray which is reflected by the reflective layer 26 will be scattered when it strikes the roughened surface 22b upon passing back through layers 24 and 22. As illustrated in FIG. 4, a partially reflected ray 50 from the front surface of plate 20 forms the image for a night mirror.

When the three layers are brought into tight compression as will be obtained when handle 44 is moved to the position illustrated in FIG. 1, the roughened surface 22b will be smoothed out by the back surface of the glass plate 20.

In the embodiment of FIG. 1, the front surface of the glass mirror plate 24 can be roughened in addition to or in lieu of the roughened surface 22a of layer 22. The mirror will function in an identical manner if this modification is made.

The intermediate layer is made from a transparent, yieldably, resilient, soft and solid material. Preferably, the material is a synthetic organic elastomeric polymer of approximately 5 to 25 durometer. A surface of the intermediate layer, when roughened, has a texture of the character produced by a 220 grid loose abrasive. Suitable elastomeric polymers include silicone rubber and polyvinyl butyral.

The glass plates 20 and 24 can be any suitable glass or plastic. When roughened, the surfaces can be etched or sandblasted.

The surface having a roughened texture will generally have a roughness value in the range of 50-200 micro inches RMS. The roughened texture can be produced by rubbing contact with a loose abrasive such as 220 grid. Sand blasting or etching can be used for rough texturing a glass surface.

The rough textured surface will restrict the passage of light therethrough in either direction as for example, frosted glass. When, however, a solid laminate is formed, either by smoothing out the rough textured surface, or by filling in the rough textured surface with the soft transparent solid, passage of light therethrough is not restricted. Thus, the invention also includes optical assemblies, such as illustrated in FIGS. 3 and 4 without the glass plate 24 and/or without the reflective layer 26.

The soft, yieldably resilient, solid such as silicone rubber is stable and not easily decomposable. The construction of the mirror can be quite simple and inexpensive. Further, the function of the mirror does not limit the design.

Reasonable variation and modification are possible within the scope of the foregoing disclosure, the drawings, and the appended claims without departing from the spirit of the invention.

The embodiments of the invention in which an exclusive property or privilege is claimed are defined as follows.

1. A day-night mirror comprising:
a first layer made from a normally rigid transparent material;
a second layer made from a normally rigid material and having a reflective surface;
a transparent intermediate layer between said first layer and said second layer, said intermediate layer being formed of a soft, yieldably resilient, solid material;
at least one surface between said intermediate layer and said first layer, and a surface between said intermediate layer and said second layer having a roughened texture which greatly reduces the transmission of reflected light through said first layer and said intermediate layer when said surface is separated from contact with a surface adjacent thereto, and to permit transmission of light reflected from said second layer and through said first layer, and said intermediate layer when said surface is firmly pressed in contact with a surface adjacent thereto, said roughened texture surface being other than said reflective surface; and
means to separate and press together said roughened texture surface and the layer adjacent thereto.

2. A day-night mirror according to claim 1 wherein said soft, yieldably resilient material has a durometer value in the range of 5 to 25.

3. A day-night mirror according to claim 1 wherein said surface having a roughened texture has a rouhghness value in the range of 50 to 200 micro inches RMS.

4. A day-night mirror according to claim 1 wherein said soft, yieldably resilient, solid material is silicone rubber.

5. A day-night mirror according to claim 1 wherein said soft, yieldably resilient, solid material is formed from a synthetic organic elastomeric polymer.

6. A day-night mirror according to claim 1 wherein said soft, yieldably resilient, solid material is polyvinyl butyral.

7. A day-night mirror according to claim 1 wherein said first layer is a glass plate and said second layer is a glass plate with a reflective coating thereon.

8. A day-night mirror according to claim 1 wherein said first layer is a glass plate and a surface of said glass plate adjacent said intermediate layer is etched to form said surface with said roughened texture.

* * * * *